(12) United States Patent
Bonnaud

(10) Patent No.: US 7,121,512 B2
(45) Date of Patent: Oct. 17, 2006

(54) DRAIN PARTICULARLY FOR ENGINE SUPPORT STRUT

(75) Inventor: Cyril Bonnaud, Toulouse (FR)

(73) Assignee: Airbus France, Toulouse (FR)

( * ) Notice: Subject to any disclaimer, the term of this patent is extended or adjusted under 35 U.S.C. 154(b) by 136 days.

(21) Appl. No.: 11/016,043

(22) Filed: Dec. 17, 2004

(65) Prior Publication Data

US 2006/0027707 A1 Feb. 9, 2006

(30) Foreign Application Priority Data

Dec. 18, 2003 (FR) .................................. 03 14891

(51) Int. Cl.
*B64D 1/00* (2006.01)
*B64D 27/00* (2006.01)
*B64C 1/00* (2006.01)

(52) U.S. Cl. ................ 244/136; 244/129.1; 244/129.2; 244/54; 244/117 A; 244/119; 244/53 R; 248/554; 248/555; 60/39.094; 60/797

(58) Field of Classification Search ............. 244/129.1, 244/129.2, 53–57, 117 A, 119, 136; 60/39.094, 60/796, 797, 226.1, 39.093; 248/554, 555
See application file for complete search history.

(56) References Cited

U.S. PATENT DOCUMENTS 2,643,832 A * 6/1953 Thwaites ................... 244/200
3,612,439 A * 10/1971 Wingham ................... 244/1 R
4,782,658 A * 11/1988 Perry ........................ 60/226.1
5,104,069 A * 4/1992 Reising ...................... 244/136
5,269,135 A * 12/1993 Vermejan et al. .......... 60/226.1
5,285,636 A * 2/1994 Mayo et al. ............. 60/39.094
5,552,576 A * 9/1996 Giamati ...................... 219/201
5,655,732 A * 8/1997 Frank .......................... 244/1 R
6,425,554 B1 * 7/2002 Moreland ................... 244/136

FOREIGN PATENT DOCUMENTS

FR 2 735 444 A 12/1996
FR 2 741 321 A 5/1997

* cited by examiner

*Primary Examiner*—Teri Pham Luu
*Assistant Examiner*—Joshua Michener
(74) *Attorney, Agent, or Firm*—Patterson, Thuente, Skaar & Christensen, P.A.

(57) ABSTRACT

A drain, for example for an aircraft engine support strut, arranged on the trailing edge of the rear secondary structure of the strut. The drain includes a conduit with a substantially horizontal axis and a substantially rectangular cross-section, taken in a plane parallel to the trailing edge, the conduit closed at an outer extremity by a terminal portion with a substantially ogival cross-section taken in the axis of the conduit and including at least one opening for drainage with an elongated shape on at least one of the opposing lateral walls.

9 Claims, 3 Drawing Sheets

US 7,121,512 B2

1

DRAIN PARTICULARLY FOR ENGINE SUPPORT STRUT

RELATED APPLICATION

The present application claims priority to French Application No. 03 14891 filed Dec. 18, 2003.

BACKGROUND OF THE INVENTION

The present invention concerns drains installed in the fairings of the rear strut and intended to evacuate potential leaks of fluids that could be inflammable, which might originate from tanks, piping or hydraulic systems located above said rear fairing in a structure integrated with the engine strut and more commonly called a rear secondary structure (RSS).

These drains are pipes with a generally elliptical cross section of non-negligible size which can reach, for example, a dimension of 150 mm ×58 mm for the largest aircraft, and which projects to the rear of the rear fairing of the engine strut and generates a drag which has an impact on fuel consumption.

Another disadvantage of these drains is their insufficient capacity for adjusting the aspiration level. The geometry of these drains effectively provides access only to a single aspiration level.

Another problem posed by these drains because of their size is the risk of introduction or installation of a wild fowl that could obstruct the conduit.

The present invention aims to alleviate these various inconveniences by proposing a new geometry for this type of drain.

SUMMARY OF THE INVENTION

To that end, the purpose of the invention is a drain particularly for the aircraft engine support strut, arranged on the trailing edge of the rear secondary structure of said strut, comprising a conduit with a substantially horizontal axis, a substantially rectangular cross-section taken in a plane parallel to said trailing edge, the conduit closed at its outer extremity by a terminal part with a substantially ogival cross-section taken in the axis of the conduit, wherein the conduit includes at least one opening for drainage with an elongated shape on at least one of the opposite lateral walls.

Depending on the implementation, said conduit can be symmetric with respect to the vertical plane passing through said trailing edge, and can include a drainage opening on its two opposite lateral walls, the major axis of which is parallel to the trailing edge and these two openings can be symmetric.

Such a drain forms a flattened conduit fitted on its lateral flanks, which are largely flat, with elongated openings in the form of louvers assuring a more effective drainage through the formation, at the outlet of the louvers, of zones of more significant low pressure than that generated at the outlet of traditional drains; the drain according to the invention additionally generates a drag that is sensibly reduced compared to that with the same traditional drains having an equivalent drainage capacity.

The louvers of such a drain can have—in comparison with a conventional drain having an elliptical drainage section of 4900 mm², 120 mm major axis and 52 mm minor axis, and equivalent drainage capacity—a generally rectangular shape

2 about 230 mm long and about 11 mm wide, which is additionally intrinsically able to prevent any intrusion by wild fowl in particular.

BRIEF DESCRIPTION OF THE DRAWINGS

Other properties and advantages will be seen in the description below of a method of implementing the device from the invention; the description is given solely as an example and in light of the attached drawings where.

DETAILED DESCRIPTION OF THE INVENTION

Figure 1:
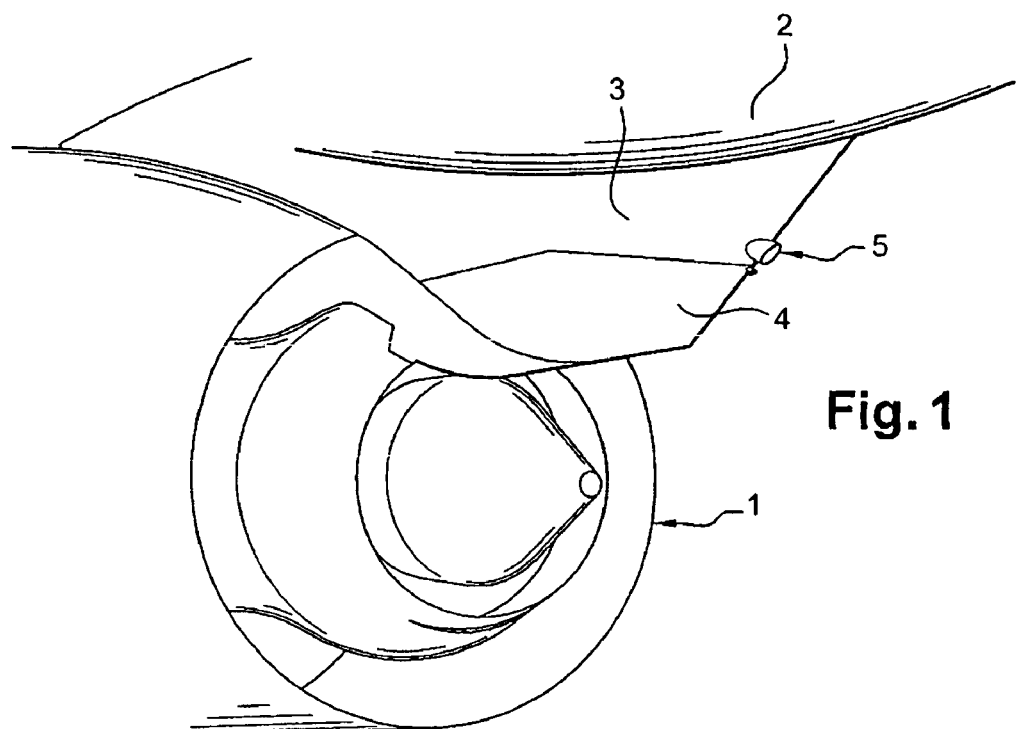
FIG. 1 is a perspective view of the rear of an engine of strut.

FIG. 1 shows schematically: an aircraft engine 1; an engine support strut 2, called engine strut; a rear secondary (RSS) 3; and a rear fairing 4 of the strut located proximate the rear of the engine 1.

Various equipment systems such as extinguishers, tanks and piping for hydraulic fluids, likely to leak liquid following, for example, loosening of the pipe joints, are traditionally installed in the RSS 3. For this reason, a drain 5 is placed on the lower part of the RSS 3 zone, on the trailing edge 6.

Figure 2:
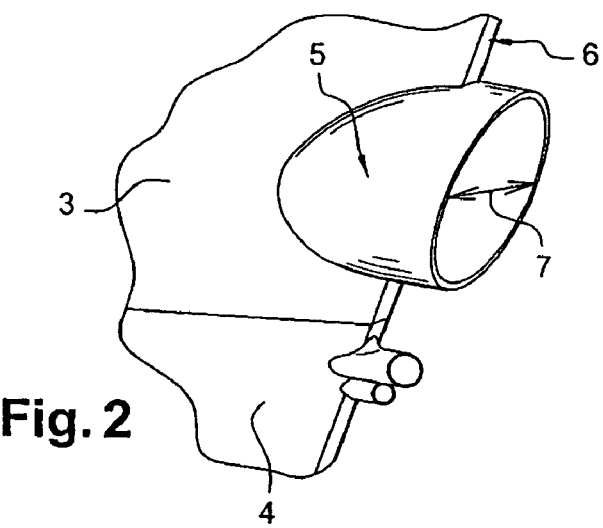
FIG. 2 is a partially enlarged view showing in more detail the drain from the part called rear secondary structure (RSS) of the strut.

Traditionally this drain 5, placed astride the trailing edge 6, has an elliptical cross section, the small axis 7 (FIG. 2) being horizontal and orthogonal to the trailing edge 6.

Figure 3:
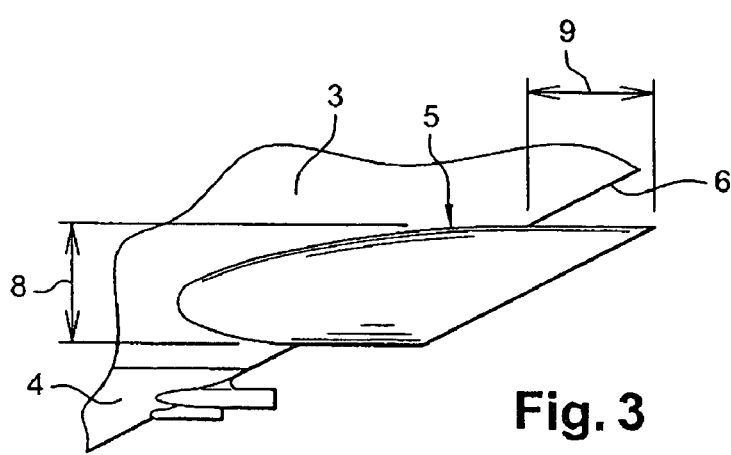
FIG. 3 is a side view of the drain from FIG. 2.

The drain 5 has its longitudinal axis slightly raised (of order 7 degrees) above the axis of the aerodynamic flow in flight. The major axis 8 of the elliptical cross section of the drain whose outlet has a beveled edge is shown in FIG. 3; the plane of the outlet is parallel to the trailing edge 6. The drain 5 projects behind the trailing edge 6 a distance 9 on the order of about 120 mm for an approximately drain 5 with a 126 mm major axis 8 and approximately 58 mm minor axis 7. The dimensions of the axes are taken on the outside of the conduit forming the drain 5, the walls of which have a thickness on the order of about 3 mm.

Figure 4:
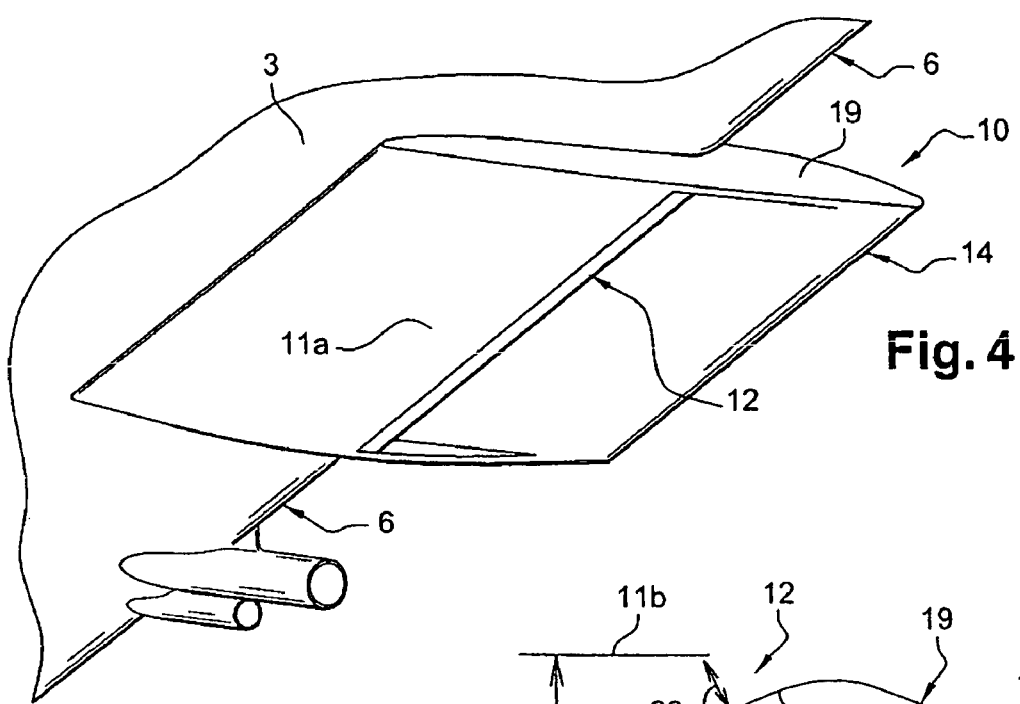
FIG. 4 is a view analogous to FIG. 2 showing a drain according to the invention in place of the conventional drain.

FIG. 4 illustrates a mode of making the drain 10 according to the invention, substituted for drain 5, made up of the conduit flattened on its sides. To better understand the shape of the drain 10, FIGS. 5 to 8 will also be referred to.

Figure 5:
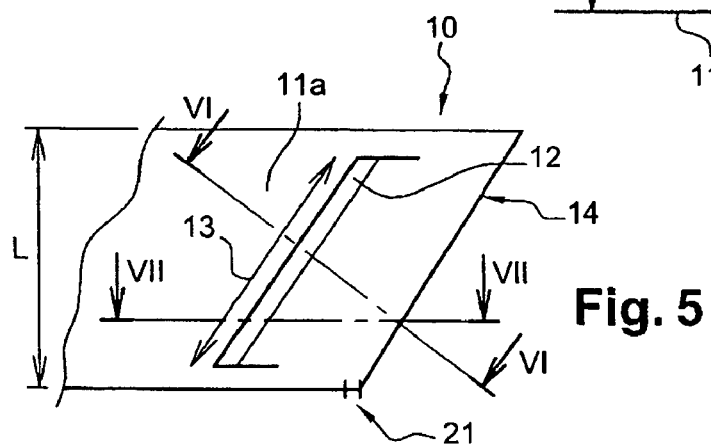
FIG. 5 is a schematic side view of the drain from FIG. 4.

FIG. 5 is a lateral elevation view of the drain 10 making apparent, on a largely flat lateral side 11a of the drain 10, an inclined opening in the shape of a louver 12 having a generally narrow rectangular section, more specifically the shape of a parallelogram, and a major axis 13 parallel to the trailing edge 6 of the structure 3, the drain 10's own trailing edge 14 also being preferably generally parallel to the edge 6.

Figure 8:
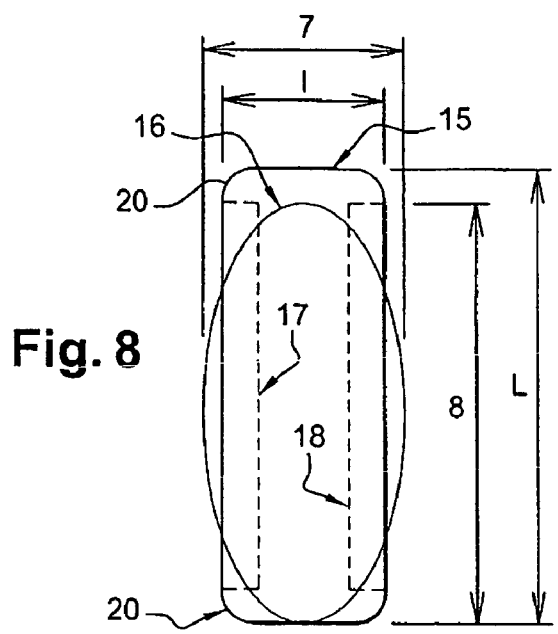
FIG. 8 is a comparative view of the cross-sections of the drain according to the invention and a conventional drain with an elliptical cross section.

FIG. 8 shows a comparison of the cross sections 15, 16, taken perpendicularly to their axis, of the drain 10 according to the invention and drain 5, respectively. It will be noted that the cross section 15 of the drain 10 is rectangular with rounded corners for aerodynamic reasons and has a length L slightly greater than the major axis 8 of the elliptical cross section 16 of the drain 5, whereas the width 1 of the cross section 15 is slightly smaller than the minor axis 7.

In FIG. 8 the dashed lines 17 and 18 symbolize the two louvers 12 put in the opposing parallel sides 11a and 11b (refer to FIG. 7) of drain 10.

Figure 7:
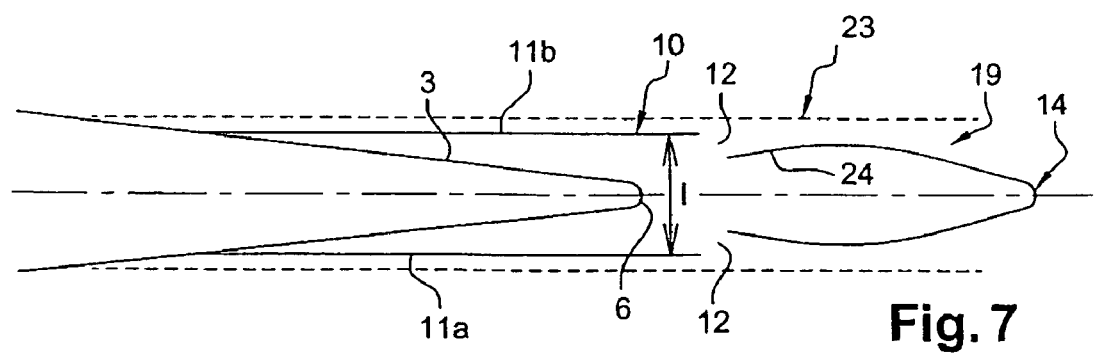
FIG. 7 is a schematic cross-section of the drain from FIG. 5 along the line VII—VII.

FIG. 7 shows a cross-section parallel to the axis of the drain 10. Note that the latter is symmetric with respect to the vertical plane containing the trailing edges 6 and 14 and that the conduit forming the drain ends in a part 19 with an ogival cross-section, also for aerodynamic reasons.

In FIG. 5, it should be noted that the louvers 12 do not extend all the way at the upper and lower edges of the drain 10 and stop (FIG. 8) at the beginning of the rounded zones 20 of the corners of the drain 10. Therefore, there remains a small zone below the drain 10 that will not be drained. To resolve this, a hole 21 can be placed in the bottom wall of the drain 10, in the area of the trailing edge 14, as depicted in FIG. 5.

Figure 6:
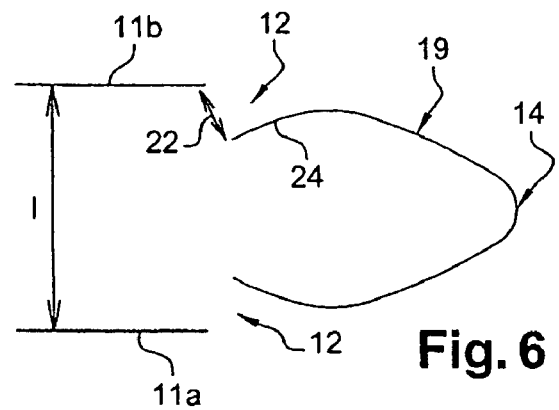
FIG. 6 is a cross-section of the drain from FIG. 5 along the line VII—VII.

In FIG. 6, the width 22 of the louvers 12, taken between a flange of side 11b and the flange of the terminal part 19, is shown. As an example, the width 22 of the louvers 12 is on the order of about 11 mm for a length 13 (FIG. 5) on the order of about 238 mm.

In FIG. 7, the contour 23 of the drain 5, slightly larger than that of drain 10, is shown.

Figure 9:
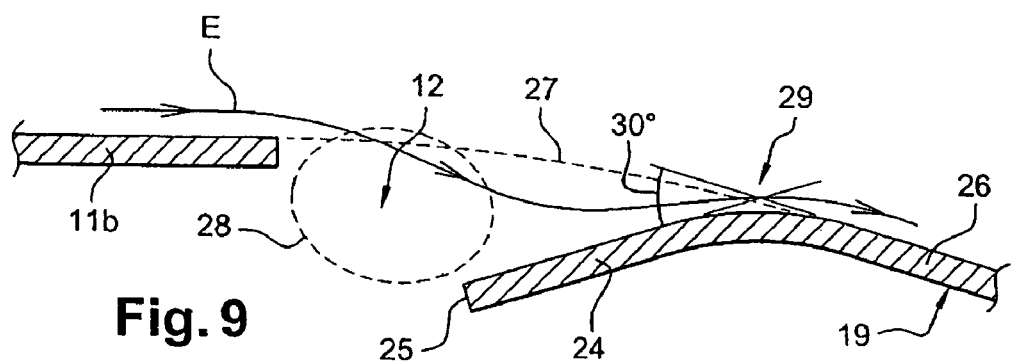
FIG. 9 is a diagram illustrating the aerodynamic flow near a louver from the drain according to the invention.

FIG. 9 shows the aerodynamic flow around the louver 12 of drain 10. The wall 24 of the terminal part 19, delimiting the louver 12 by its edge 25, is slightly recessed towards the interior of the drain 10, with respect to the adjacent part 26 intermediate the part 24 and the nose 14 (see FIG. 7) of the ogive, part 26 of which is in the curve (dashes 27) of this side 11b of the drain 10.

A zone 28 of maximal low-pressure is created deflecting the flux of the grazing flow E by a few degrees towards the interior of the drain 10 near the louver 12.

The flow E is next taken by the outer side of the wall 24 and accelerated at 29. The role of wall 24 is to take this flow to prevent it from penetrating into the drain 10.

The angle formed between the tangent to the wall 26 and the outer face of the wall 24 is on the order of about 30 degrees.

Tests showed that in the zones 28 of the louvers 12 low-pressure regions are created corresponding to negative pressure coefficients $K_P$ on the order of approximately −0.34 in comparison with low-pressure regions with a $K_P$ coefficient of approximately −0.19 at the outlet of the conventional drain 5 with the same drainage capacity. The drains tested had profiles identical to those from FIG. 8.

Figure 10:
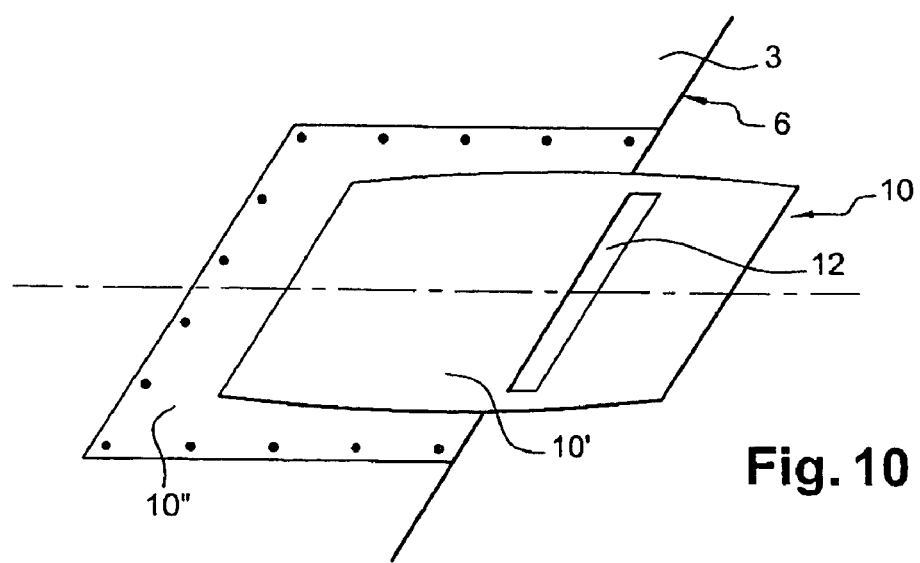
FIG. 10 is a schematic view showing the placement of the drain in the RSS structure.

FIGS. 10 show a practical method of making the drain 10 according to which the part of the drain 10 properly called 10' is extended in its part plugging into the stem post made up by the trailing edge 6 of the structure 3 and two symmetric parts 10" intended to come flush with the wails of the two sides of the structure 3, the stem post of the latter consequently being cut to receive the unit 10'–10".

Generally the louvers 12 are parallel to the trailing edge 6 and in the immediate area of this edge, and on both sides.

The dimensions and the shape of the louvers 12 can of course vary depending, for example, on the desired drainage capacity.

In the embodiment described, the ratio between the length 13 (FIG. 5) and the width 22 (FIG. 6) of each louver 12 is about 20, but it could be different according to the applications, specifically depending on the desired drainage capacity, the flow cross-section of the louvers 12 depending on this capacity. The width 22 must preferably on the order of about 10 to 20 mm to avoid the intrusion of wild fowl.

Generally, the aggregate flow cross-section of the two louvers 12 will be slightly greater than the internal cross-section of the drain conduit 10 upstream from the louvers 12.

The shape of the external cross-section of the drain 10 shown with a rectangular contour 15 in FIG. 8 can also vary, with it understood that the width 1 will be slightly less than the minor axis 7 of the drain 5 with an elliptical cross-section of equivalent drainage capacity. The ratio of the length L of the cross-section 15 to the width 1 is preferably on the order of about 2.8 as shown in the example from FIG. 8. This ratio can vary in the range from about 1 to about 10.

The sides 11a and 11b of the drain 10 are preferably generally flat, but could potentially be slightly convex.

Beyond the aspiration capacity of a drain like 10, noticeably greater than that of a conventional drain 5 not only in flight but also taxiing on the ground, the aerodynamic behavior of drain 10 in flight is very favorable in comparison with that of drain 5. In fact, the resulting drag is significantly reduced notably because of the fact of the creation of the aspiration zone on the sides of the drain 10, near the louvers 12, and not right at the rear nose 19 of the drain 10 which is profiled, whereas in the conventional drain 5, the aspiration is created behind the drain 5, the low pressure thereby formed downstream directly and more amply contributes to the creation of drag.

As an example and for the embodiment described, the drain 10 projects on the trailing edge 6, axially to the aerodynamic flow, a distance on the order of about 120 mm equivalent to distance 9 of drain 5.

The invention claimed is:

1. A drain for an aircraft engine support strut, arranged on a trailing edge of a rear secondary structure of the strut, comprising:
a conduit having a substantially horizontal axis, and a substantially rectangular cross-section taken in a plane parallel to the trailing edge,
wherein the conduit is closed at an outer extremity by a terminal portion having a substantially ogival cross-section taken in the transverse axis of the conduit
and wherein the conduit includes at least one drainage aperture having an elongated shape on at least one of two opposing lateral walls,
wherein said at least one aperture extends substantially an entire vertical distance on said at least one of two opposing lateral walls.

2. A drain according to claim 1, wherein the conduit is substantially symmetric with respect to a vertical plane containing the trailing edge.

3. A drain according to claim 1, wherein the conduit includes two drainage apertures having elongated shapes and arranged on the two opposing lateral walls, wherein a major axis of each drainage aperture is substantially parallel to the trailing edge.

4. A drain according to claim 3, wherein the drainage apertures are substantially symmetric.

5. A drain according to claim 1, wherein the at least one drainage aperture is arranged proximate an area of the trailing edge of the rear secondary structure, upstream of the terminal portion.

6. A drain according to claim 1, wherein a width of the at least one drainage aperture is in the range of about 10 millimeters to about 20 millimeters.

7. A drain according to claim 6, wherein a ratio between a length of the substantially rectangular cross-section of the conduit taken in a plane substantially parallel to the trailing edge and a width of the substantially rectangular cross-section is in the range of about 1 to about 10.

8. A drain according to claim 6, wherein the at least one drainage aperture is defined in the direction of the width between an edge of the at least one opposing lateral wall and an edge of a part of the terminal portion having a substantially ogival cross-section, the part directed towards an interior of the drain to define a plane of accelerating aerodynamic flow along at least a length of the at least one opposing lateral wall.

9. A drain according to claim 8, wherein the part forms an angle of about 30 degrees with a tangent to an adjacent part of the terminal portion.

* * * * *